(12) United States Patent
White

(10) Patent No.: US 12,265,581 B1
(45) Date of Patent: Apr. 1, 2025

(54) MULTI-MODAL SEARCH REQUEST ROUTER

(71) Applicant: Microsoft Technology Licensing, LLC, Redmond, WA (US)

(72) Inventor: Ryen William White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/374,533

(22) Filed: Sep. 28, 2023

(51) Int. Cl.
| | |
|---|---|
| G06F 16/00 | (2019.01) |
| G06F 16/18 | (2019.01) |
| G06F 16/3329 | (2025.01) |
| G06F 16/953 | (2019.01) |
| G06F 16/9535 | (2019.01) |
| G06F 16/9538 | (2019.01) |
| G06N 20/00 | (2019.01) |

(52) U.S. Cl.
CPC ........ G06F 16/953 (2019.01); G06F 16/1815 (2019.01); G06F 16/3329 (2019.01); G06F 16/9535 (2019.01); G06F 16/9538 (2019.01); G06N 20/00 (2019.01)

(58) Field of Classification Search
CPC . H04L 51/02; G06F 16/3329; G06F 16/9535; G06F 16/1815; G06F 16/9538; G06F 16/953; G06F 40/279; G06N 20/00; G06Q 50/50; G06Q 50/12; G06Q 50/30; G06Q 51/02
See application file for complete search history.

(56) References Cited

U.S. PATENT DOCUMENTS

| | | | |
|---|---|---|---|
| 10,769,552 B2 * | 9/2020 | Beamon | G06F 16/313 |
| 2003/0220909 A1 * | 11/2003 | Farrett | G06F 16/951 |

(Continued)

FOREIGN PATENT DOCUMENTS

| | | | |
|---|---|---|---|
| WO | WO 2019048941 A1 * | 3/2019 | |
| WO | WO 2021222396 A1 * | 11/2021 | |

OTHER PUBLICATIONS

Aditya Pandey et al., "Search Engine for Assorted Media in Chat Applications", 2022 IEEE World Conference on Applied Intelligence and Computing (AIC), pp. 130-135.*

(Continued)

*Primary Examiner* — Srirama Channavajjala
(74) *Attorney, Agent, or Firm* — Schwegman Lundberg & Woessner, P.A.

(57) ABSTRACT

Multi-modal search systems with improved search request routing are provided. A device can include a module that identifies, based on content of a search request, provider criterion that indicates factors to be considered in making a routing decision, a criterion processor that determines, based on the provider criterion, a routing decision indicating whether to route the search request to a search engine or a chat engine based, at least in part, respective compute costs of servicing the search request using the search engine and the chat engine, respectively, and respective accuracies of responses provided responsive to the search request using the search engine and the chat engine, respectively, and an output port coupled to receive the search request and to provide the search request to the search engine or the chat engine in accord with the routing decision.

12 Claims, 5 Drawing Sheets

(56) References Cited

U.S. PATENT DOCUMENTS

| | | |
|---|---|---|
| 2008/0275701 A1* | 11/2008 | Wu ..................... G06F 16/685 |
| | | 704/235 |
| 2010/0057675 A1 | 3/2010 | White et al. |
| 2011/0218018 A1 | 9/2011 | Phillips |
| 2014/0297268 A1* | 10/2014 | Govrin ..................... G06N 5/02 |
| | | 704/9 |
| 2016/0293034 A1* | 10/2016 | Agarwalla ............. G06N 20/00 |
| 2019/0156177 A1* | 5/2019 | Abdallah .......... G06F 16/90332 |
| 2020/0372055 A1* | 11/2020 | Joko ..................... G06F 40/268 |
| 2021/0097097 A1* | 4/2021 | Alkan ................. G06F 16/3329 |
| 2022/0229987 A1* | 7/2022 | Davasam Suryanarayan .............. |
| | | G06N 5/01 |
| 2022/0286482 A1* | 9/2022 | Barday ................... H04L 51/18 |
| 2023/0079148 A1* | 3/2023 | Anand .................... G06F 40/30 |
| | | 707/769 |
| 2023/0245144 A1* | 8/2023 | Howard ................. G06Q 50/01 |
| | | 705/7.29 |

OTHER PUBLICATIONS

International Search Report and Written Opinion received for PCT Application No. PCT/US2024/046511, mailed on Nov. 29, 2024, 13 pages.

\* cited by examiner

MULTI-MODAL SEARCH REQUEST ROUTER

BACKGROUND

Web search engines now offer two answer modalities: traditional search and chat. Chat includes actual chats or other new content creation, while traditional search is retrieval of existing content. Chat is driven by operations of a large language model (LLM). Examples of LLM include Bing Chat from Microsoft Corporation of Redmond, Washington, United States of America (USA) and Generative Pre-trained Transformer (GPT) 4 (GPT-4) from Open AI of San Francisco, California, USA. Traditional search technology is extremely powerful and relatively cheap. The traditional search technology has been honed over decades to provide direct answers (for weather, stock quotes, sports scores, etc.) and organic search results (so-called "10 blue links") for other requests.

SUMMARY

Embodiments regard circuits, devices, and methods for web search. The circuits, devices, and methods are configurable to allow a web provider to balance cost of operating search equipment and accuracy of responses provided. A web search router can be used to implement the web search routing. The web search router can include an input port that receives a search request. A criterion identification module of the web search router can identify, based on content of the search request, provider criterion that indicates factors to be considered in making a routing decision. The web search router can include a criterion processor that determines a routing decision based on the provider criterion. The routing decision can indicate whether to route the search request to a search engine or a chat engine. The routing decision can be based, at least in part, on respective compute costs of servicing the search request using the search engine and the chat engine. The routing decision can be based, at least in part, on respective accuracies of responses provided responsive to the search request using the search engine and the chat engine, respectively. The search engine is configured to provide, based on the search request, existing content. The chat engine is configured to generate, based on the search request, new content. The router can include an output port coupled to receive the search request. The output port can be coupled to provide the search request to the search engine or the chat engine in accord with the routing decision.

The search request can specify user criterion that includes a factor to be considered by a web search provider in making the routing decision. The user criterion can be provided by the user through an entry point to the web search provider. The factor can indicate a preference for using the chat engine or the search engine in answering the search request, among other factors. The factor can indicate a preference for accuracy of the responses of the search request.

The criterion processor can weight the provider criterion resulting in weighted criterion. Weights of the provider criterion can be applied to balance a higher cost in operating the chat engine with an accuracy of responses provided responsive to the search request. The criterion processor can operate a machine learning (ML) model based on the weighted criterion.

The criterion processor can be configured to, responsive to determining a direct answer to the search request is available, route the search request to the search engine regardless of any other criterion. The criterion processor can be configured to, responsive to determining an answer to the search request requires generating content, route the search request to the chat engine regardless of any other criterion.

The router can be communicatively coupled to a search history database. The search history database can include entries that detail search requests that have a direct answer and search requests that are accurately answered by the chat engine.

DETAILED DESCRIPTION

Figure 1:
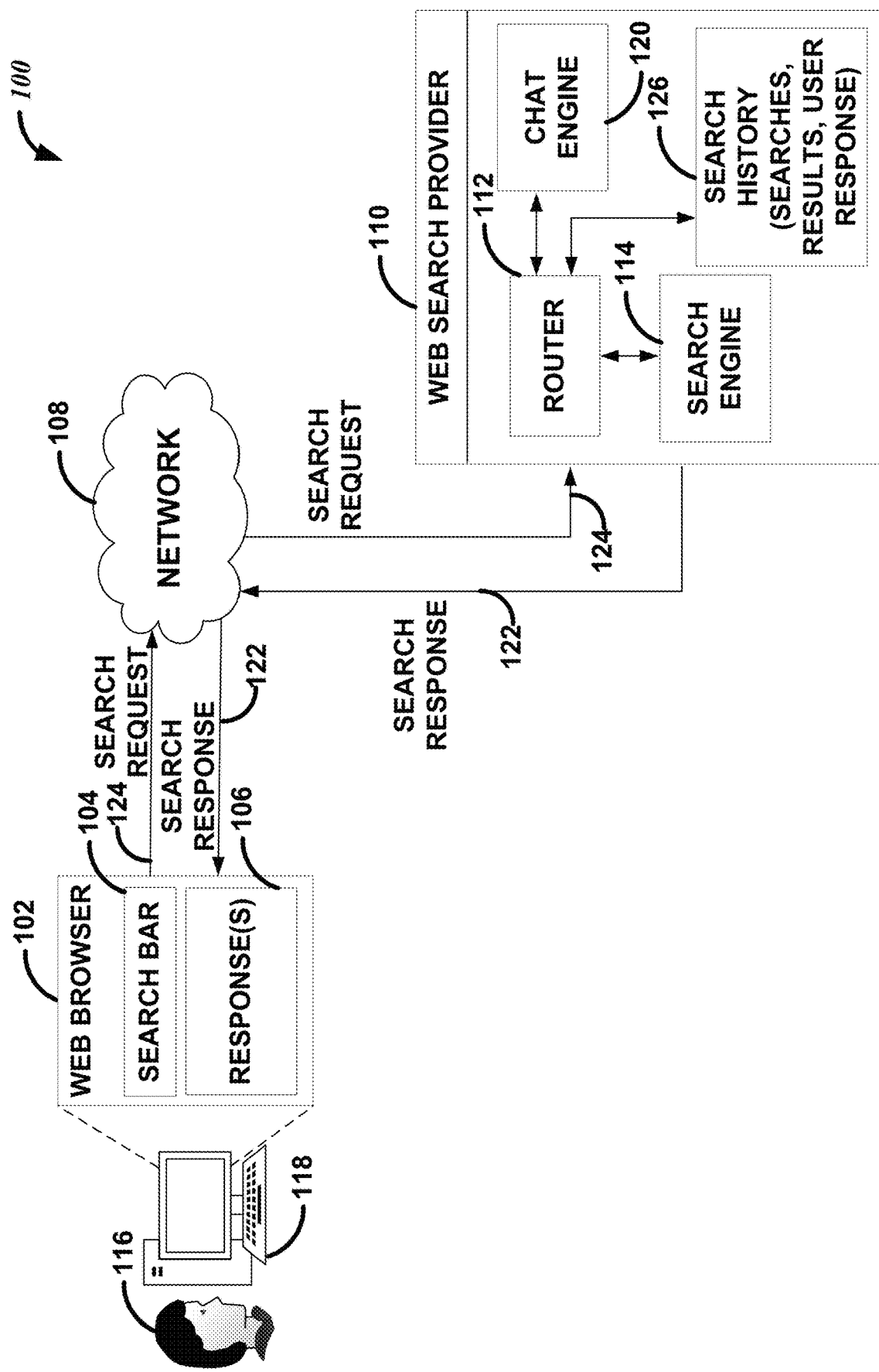
FIG. 1 illustrates, by way of example, a diagram of a web search system that includes a search query router.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

As discussed in the background, traditional search returns previously generated web content based on a search query. In comparison to traditional search techniques, large language model (LLM) inference is extremely costly in terms of compute resource cost and bandwidth. Further, the LLM can hallucinate incorrect answers. However, LLMs have capabilities that extend beyond that of traditional search. The LLMs can synthesize answers, create content, and perform other tasks beyond retrieving web content. A given user may not know which modality to pick. Search providers face increasing costs to serve answers from an LLM as the number of web requests for LLM-generated content continues to increase in popularity.

The web request router provided herein allows a web search engine provider to balance the cost of servicing a request, an accuracy of a response, other client or web search provider considerations, or a combination thereof. Examples of web search engines include Google® from Google LLC of Mountain View, California, USA, Microsoft Edge® from Microsoft Corporation of Redmond, Washington, USA, Firefox® from Mozilla Foundation of San Francisco, California, USA, among others. Each of the web search engines provides a browser user interface (UI). A user enters a search query, typically into a search bar of the UI. The search query is then operated on by search circuitry (e.g., a chat engine or a traditional search engine, sometimes called just "search engine") to determine what responses to provide to the user. The responses are then provided to the user through the same entry point that issued the request. Example entry points include a web browser, a dedicated app, a smart speaker, a virtual assistant, or other entry point. For example, if the user issued the search request through a web browser, the responses are typically provided through the web browser. The description provided includes the use of a web browser but is not limited to the web browser. The entry point through which the user interacts to issue a request and receive responses can be any other entry point. The responses can be provided as text, rich text, a document, hyperlink to content, a combination thereof, or the like.

The web request router can receive the request and determine, based on default or user-specified routing criterion, which of (i) a chat engine and (ii) a traditional search engine (sometimes services the query. There is a wide variety of criterion. There is also a wide variety of ways of determining which search engine receives the request based on the criterion. The criterion can, at a minimum, consider a cost of operating the search engine (whether it be the chat engine or the traditional search engine) and an expected accuracy of the results provided by the search engine.

FIG. 1 illustrates, by way of example, a diagram of a web search system 100 that includes a search query router 112. A more detailed view and description of the search query router 112 is provided regarding FIG. 2. The system 100 as illustrated includes a compute device 118 through which a user 116 accesses functionality of a web browser 102 user interface (UI). The web browser 102 interfaces with application programming interfaces (APIs) that communicate search requests 124 to a network 108. The network 108 interfaces with end points that service the search request 124. One endpoint is a web search provider 110 associated with the web browser 102. The web search provider 110 leverages a chat engine 120, a search engine 114, a router 112, and a search history database 126 to provide search responses 122 to the user 116 through the browser 102. The web browser 102 is merely an example of an entry point and other entry points can be substituted for the web browser. Other entry points include a virtual assistant, a smart speaker, a dedicated app, or the like.

The compute device 118 can include a laptop computer, desktop computer, smartphone, appliance, vehicle, accessory (e.g., watch, activity monitor device, or the like), personal digital assistant, an internet of things (IoT) device, or the like. The user 116 accesses internet or other network content through the compute device 118. The user 116 causes the compute device 118 to execute the web browser 102 application. The user 116 enters a search query into a search bar 104 of the browser 102. The search query can take many forms including alphanumeric text, symbol, image, audio, video, or a combination thereof.

The browser 102 communicates a search request 124 that is developed based on the search query to the network 108. The request for search responses 122 indicates a specific web search provider, via a uniform resource locator (URL), that is to receive and service the search request 124. The network 108 routes the search request 124 to the corresponding web search provider 110.

The web search provider 110 includes a router 112 that analyzes the search request 124. The router 112 identifies criterion based on the analysis. The router 112 can communicate with the search history database 126 to determine or identify criterion relevant to the routing decision. The router 112 determines which of the chat engine 120, search engine 114, or a combination thereof to route the search request 124 based on the criterion. More details regarding the operation of the router 112 are provided regarding FIG. 2.

The search engine 114 is a traditional search engine, such as a traditional search engine discussed previously. The search engine 114 operates to retrieve content that already exists. The search engine 114 can retrieve the content through the network 108.

The chat engine 120 is a neural network (NN) model that operates to generate content based on the search request 124. The chat engine 120 can be a large language model (LLM), such as an LLM discussed previously or a different LLM. However, LLMs are not the only NN that can generate content or answers that are not based on pre-existing content. Other model types, such as a generative model, a classifier, a masked language model, or the like, can be used in the chat engine 120.

The router 112 can receive the response from the chat engine 120, the search engine 114, or a combination thereof, and formulate the responses into search responses 122. The search responses 122 are provided to the network 108 and routed to the compute device 118. The search responses 122 are provided to the user 116 through a responses 106 portion of the web browser 102. While the responses 106 are illustrated as visible, the responses 106 can be provided in an audio or tactile form as is appropriate.

The web browser 102 can provide the user 116 with an ability to unilaterally select which of the chat engine 120 and the search engine 114 is used to service the search request 124. Such a configuration allows the web search provider 110 to be overburdened with requests for search responses 122 from the chat engine 120. Operating the chat engine 120 costs significantly more compute resources and compute bandwidth than the search engine 114. Often, the user 116 does not understand which of the chat engine 120, search engine 114, or a combination thereof is best suited to service the search request 124. A better solution is to, possibly with user input, route the search request 124 for the user 116. This is because the web search provider 110 understands better the metes and bounds of the abilities of the search engine 114 and the chat engine 120. The web search provider 110 also understands better the costs of operating the search engine 114 and the chat engine 120. The router 112 thus provides the web search provider 110 with the ability to intelligently route the search request 124 to achieve objectives of the web search provider 110 and still provide accurate responses, which is an objective of the user 116.

The search history database 126 stores search request statistics and historical responses. The search history database 126 can include data indicating whether a given search request has a direct answer, a popularity of a search request, a frequency of a search request, or other criterion-relevant data. The criterion can be determinative or a factor. Criterion that is determinative means that a single criterion is determinative of the engine that is to receive the search request. For example, a search request 124 that has a direct answer can always be routed to the search engine 114 regardless of the remainder of the criterion. The direct answer can be a result (a response from the search engine 114 is sometimes called a "result" while a response from the chat engine 120 is sometimes called an answer) that is known to be accurate whether the direct answer is a number, a link, a passage, a document, or the like. The search engine 114 is less costly to operate so the more search requests 124 that can be serviced by the search engine 114, the better the throughput of the web service provider 110. In another example, a search request 124 that requires content to be creative can always be routed to the chat engine 120 regardless of the remainder of the criterion. This is because the search engine 114 (outside of simple fill in the blank type of personalization) is not capable of creating new content. In an example, a criterion from the user requesting a specific engine can be determinative, but in another example the same criterion can be a factor. Criterion that is a factor means that criterion is considered along with other criterion in making the routing decision.

Figure 2:
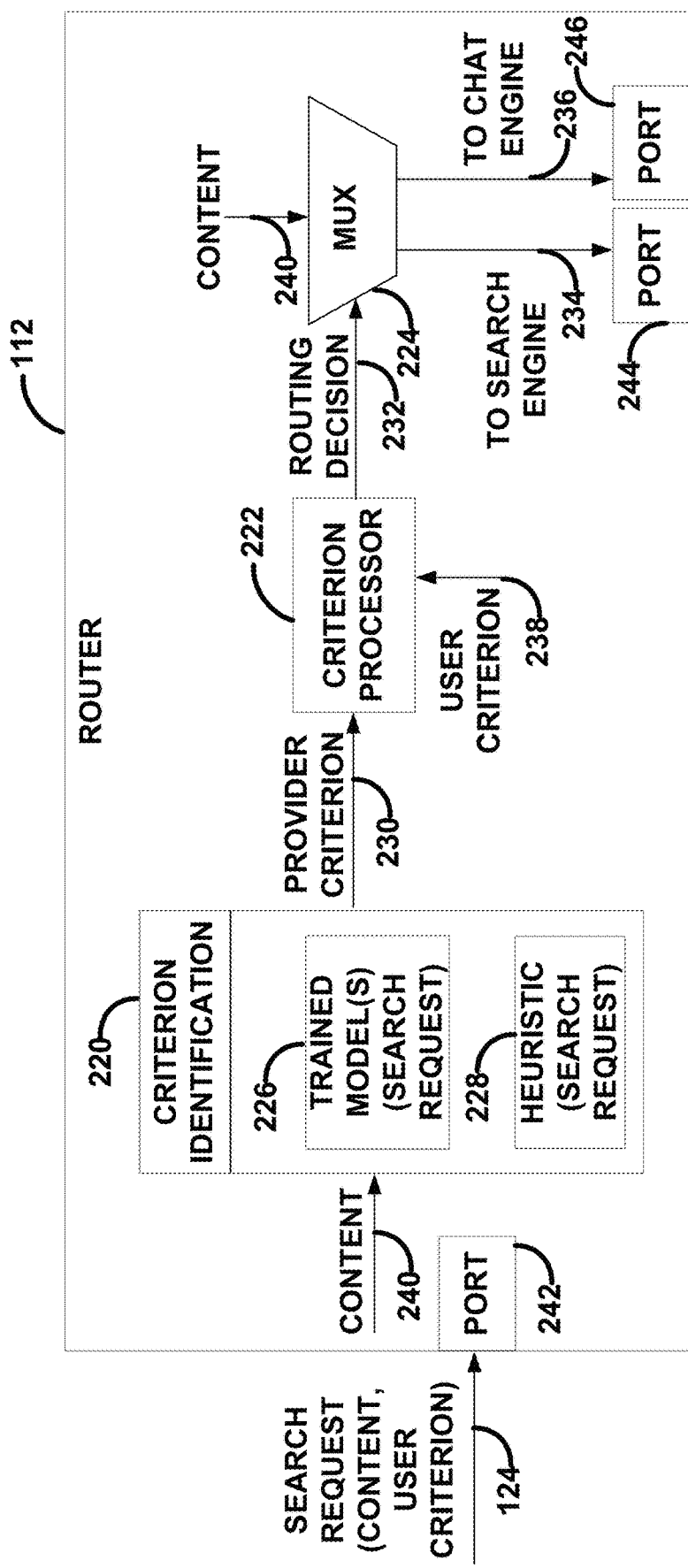
FIG. 2 illustrates, by way of example, a diagram of an embodiment of the router.

FIG. 2 illustrates, by way of example, a diagram of an embodiment of the router 112. The router 112 as illustrated receives the search request 124 at an input port 242 and provides the search request 124 to either the search engine 114, the chat engine 120, or a combination thereof through a first output port 244 or a second output port 246. The search request 124 includes content and optionally includes user criterion 238. The content is the search entered by the user 116 into the search bar 104. The user criterion 238 is any specification from the user 116 indicating their preference for how the search is performed. For example, the user 116 can specify that they prefer the search to be conducted by the chat engine 120, the search engine 114, or a combination thereof. The user 116 can specify that they prefer a more accurate response over a fast response, or vice versa. The user 116 can specify an order of search preference. For example, consider the search "generate an image of the most popular photo of Mount Everest in the style of Banksy". The user can specify that the search engine 114 be used first, followed by the chat engine 120. The search engine 114 can retrieve the most popular photo of Mount Everest and the chat engine 120 can, with the most popular photo of Mount Everest as input, generate a version of the most popular photo in the style of Banksy.

The router 112 includes a criterion identification module 220 that receives the content 240 of the search request 124 and produces provider criterion 230. The criterion identification module 220 can include or leverage a trained model 226, a heuristic model 228, or a combination thereof to determine the provider criterion 230. The provider criterion 230 is the parameters of the search request 124 that are important to the web search provider in making the routing decision.

The provider criterion 230 can include an inferred intent of the user 116. The intent of the user 116 is the intent associated with the search, sometimes called a search intent. The search intent can be navigational, fact-finding, creative, a combination thereof, or the like. Navigational intent includes looking for directions to a specified location. Fact-finding intent includes searching for documented knowledge, like a sports score, a time of a game, a location of an event, a scientific fact, a mathematical result, or the like, a document or website, or the like. Fact-finding intent can also include identification, like, plant identification, animal identification, object identification, location identification, or the like based on an image. Creative intent includes creation of content, such as a response to a chat query, an image, text, a video, a combination thereof, or the like. User 116 intent can be determined by the trained model(s) 226. The trained model(s) 226 can be trained in a supervised manner to classify the intent based on the content 240. Intent classifiers are known model types.

The provider criterion 230 can include an input and output modality of the search request 124. The input or output modality can include text, rich text, image, website, document, video, audio, or the like. The input and output modalities can be inferred from the search request 124 and determined by the trained model(s) 226 or the heuristic model 228. A search for "generate a stand-up routine in the style of a cross between Taylor Tomlinson and Bert Kreischer" is a text modality and this can be discerned by the trained model 226 which is trained to classify the type of output desired or the heuristic model 228 which can perform linguistic analysis on the content 240 to identify that text is desired. A search for "a version of this image in the style of Picasso" is asking for an image as output based on a combination of text and an image as input. The modality of input and/or output can be discerned by either the trained model 226 or the heuristic model 228.

The provider criterion 230 can include whether the user 116 wants the output to be generated (chat) or wants an output that already exists (search). Again, the trained model 226, heuristic model 228, or a combination thereof can be used to determine whether the output is to be generated, already exists, or a combination thereof. Often, requests to generate new content include a verb that indicates the content is to be generated. Examples of such verbs include "write", "generate", "create", "produce", among others. The heuristic model 228 can search for such words and indicate the request is for content to be created. Sometimes, though, the search request is for content generation and it does not include such words. For example, in an automated session a user can simply type "hello", "I am having a problem with X device, can you help?", or the like. These sorts of a generation requests can be detected as being conversational in nature. Either of the trained model 226 or the heuristic model 228 can be trained to detect conversational statements.

The provider criterion 230 can include a complexity. The complexity can include a length of the search request 124 (e.g., in terms of number of words, number of sentences, number of syllables, number of phonemes, or the like), a number of keywords (e.g., keywords weighted such that creation-related words are weighted either higher or lower than non-creation keywords such that a higher sum indicates more or less complex), a history of responses from prior similar or same searches (e.g., from the search history database 126, where user responses of further searching on the topic indicates a more complex search), chat feedback (e.g., from the search history database 126, where further user inquiry and clarification indicates a more complex search), or the like.

The provider criterion 230 can include a completeness of the search request 124. The completeness can be determined based on grammatical analysis of the request 124. Grammatical analysis can be performed by the trained model 226 or the heuristic model 228. If the request 124 is not grammatically comprehensible, the request 124 can be considered incomplete and can benefit from clarification. The completeness can be determined based on history of similar searches in the search history database 126. Search histories for search requests 124 that include multiple iterations of follow up requests or clarification can be deemed incomplete.

The provider criterion 230 can include a popularity of the search request 124. The popularity can be tabulated in a table in the search history database 126. The search history database 126 can be queried to return the popularity of the search request 124. The popularity can be specified in a number of ways, such as a rank, a total number of requests, a total number of requests per unit time, or the like.

The provider criterion 230 can include a frequency of using each modality for the user, their cohort, the general population, or the like. The frequency can include specifying a percentage of requests from the user, cohort, or general population that have historically been forwarded to the chat engine 120 and the search engine 114.

The provider criterion 230 can include past success with a specific modality for the same or a similar task, again per user, cohort, the general population, or a combination thereof. The past success can be indicated by user 116 feedback, user action (the user 116 moves on to a next topic after receiving the responses indicating success), or the like. Like frequency, past success can be specified in a variety of manners. For example, the past success can be specified per chat engine 120 answers provided for similar requests and per search engine 114 results provided for similar requests.

The provider criterion 230 can include inferred progress of satisfying the request 124 so far. As responses are provided to the user 116, success of the responses can be monitored. Success (or lack of) can be indicated by dwell time on a response (less dwell time indicating lower success), click away (click away indicating lower success), a combination thereof or the like. The success, like other provider criterion 230, can be indicated by history detailed in the search history database 126, a follow up question with the user 116 asking for feedback, or the like.

The provider criterion 230 can include availability of a direct answer from the search engine 114. Since the search engine 114 is much cheaper to operate than the chat engine 120, the provider can benefit from knowing whether there is a known direct answer available from the search engine 114. The direct answer availability can be detailed in the search history database 126. A request 124 with a corresponding entry, in the search history database 126, that indicates the search engine 114 provided a direct answer is deemed to be a request 124 with a direct answer. The search history database 126 can additionally, or alternatively, include a cache of direct answers provided by the search engine 114. If the search request 124, or a similar search request, is present in the cache, the search request 124 can be deemed to have a direct answer.

The provider criterion 230 can include an inferred quality of search responses available from the search engine for a current request. The quality of search responses can include the past success discussed previously (a higher percentage of past success can correspond to a higher quality rating. The quality of search responses can include an authoritativeness of the search responses. Authoritativeness is an indication of expertise. Expertise can be indicated by user behavior (if more users look to a website for answers in a given category of requests, the website can be considered more authoritative for that category), credentials (e.g., a certification, education level, or the like), a combination thereof, or the like. The quality of search responses can be indicated by user 116 feedback, such as by the user 116 providing feedback indicating that the responses were accurate, that the website is trustworthy or expert, or the like. The search history database can include a table or other storage of a measure of the authoritativeness of a given response.

The provider criterion 230 can include a serving cost per request. The serving cost can indicate a value that corresponds to an amount of compute resources, bandwidth, power usage, a combination thereof, or the like that is consumed by using a specified modality to service the request 124. The cost to serve the request 124 can be determined by the trained model 226, the heuristic model 228, a combination thereof, or the like. The cost to serve can be an average cost to service a request by the chat engine 120 or the search engine 114.

The provider criterion 230 can include available compute budget from the search provider and for the chat engine 120 and the search engine 114. Since it takes a significant amount more compute time, compute bandwidth, and power to service the request 124 using the chat engine 120, the chat engine 120 can service fewer requests than the search engine 114. The chat engine 120 can thus have its bandwidth consumed with fewer requests than the search engine 114. Another way of saying that, is that the throughput of the search engine 114 is much higher than the chat engine 120.

The provider criterion 230 can include a hallucination rate of the chat engine 120. The hallucination rate is a percentage or ratio of hallucinations per number of requests the chat engine 120 provides. A hallucination is generated content that is nonsensical or unfaithful to the request 124. The higher the hallucination rate of the chat engine 120, the worse the experience of the user 116. The provider wants to provide a better user experience.

The provider criterion 230 from the criterion identification module 220 are provided to a criterion processor 222. The criterion processor 222 can also receive the user criterion 238 from the search request 124. The provider criterion 230, like the criterion identification module 220 can use machine learning (ML), a heuristic, or a combination thereof, to make a routing decision 232. A heuristic can consider each of the provider criterion 230, weight the provider criterion 230, sum the weighted provider criterion 230, and compare the sum to a specified threshold. The weights can be such that a lower (or higher) weight corresponds to favoring use of the search engine 114 and a higher (or lower) weight corresponds to favoring use of the chat engine 120. Some of the criterion (whether the user criterion 238 or the provider criterion 230) of a given request can favor using the search engine 114, while other of the criterion can favor using the chat engine 120. The criterion processor 222 can effectively weigh the costs of operating and using the chat engine 120 to perform the search, accuracy of the search responses, user experience of using the browser 102 or other entry point, and others, to route the search request to one of the chat engine 120 or the search engine 114.

The criterion considered by the criterion processor 222 can include an inferred intent of the user 116, an input and output modality of the search request 124, whether the user 116 wants the output to be generated (chat) or wants an output that already exists, a complexity of the request 124, a completeness of the search request 124, a popularity of the search request 124, a frequency of using each modality for the user, their cohort, the general population, or the like, past success with a specific modality for the same or a similar task, again per user, cohort, the general population, or a combination thereof, inferred progress of satisfying the request 124 so far, availability of a direct answer from the search engine 114, an inferred quality of search results available from the search engine 114 for a current request, a serving cost per request, available compute budget from the search provider and for the chat engine 120 and the search engine 114, a hallucination rate of the chat engine 120, or the like.

The following description regards weighting the criterion with the assumption that higher weight corresponds to routing to the search engine 114 and a lower weight corresponds to the routing to the chat engine 120. Other weighting, heuristic, and trained model classifications can be made to make the routing decision, so this description is merely for illustrative purposes. The weight scale is assumed to be 0-100 with low weights being less than 50 and high weights being higher than 50. Middle weights are 50 for this example. Other weighting scales are possible and this weight scale is provided just for explanation purposes.

If the inferred intent of the user 116 is to retrieve, the criterion processor 222 can weight the inferred intent criterion with a high value. If the inferred intent of the user 116 is to create, the criterion processor 222 can weight the inferred intent criterion with a low value. If an input modality is an image, the criterion processor 222 can weight the input and output modality criterion with a low weight. If an input modality is text, an output modality is text, image, or other, the criterion processor 222 can weight the input and output modality criterion with a middle weight. If the user 116 wants the output to be generated, the weight of the user-specified modality can be set low. If the user 116 wants an output that already exists, the weight of the user-specified modality can be set high. If a complexity of the request 124 is high, the weight can be set low and vice versa. If a completeness of the search request 124 is low the completeness weight can be set low. If a completeness of the search request 124 is high the completeness weight can be set high. If the search request is popular the popularity weight can be set high. If the search request 124 is not popular, the popularity weight can be set middle or low. If a frequency of using the chat engine 120 to service like requests is high the frequency weight can be set low. If a frequency of using the search engine 114 to service like requests is high the frequency weight can be set high. If like requests have a higher rate of past success (relative to that of the search engine 114) with the chat engine 120 the past success weight can be set low. If like requests have a higher rate past success with the search engine 114, the past success weight can be set high. If an inferred progress of satisfying the request 124 so far indicates that progress is not being made, an inferred progress weight can be set low. If the inferred progress of satisfying the request 124 so far indicates that progress is being made, the inferred progress weight can be set middle or high. If a direct answer from the search engine 114 is available a direct answer weight can be set high. If a direct answer from the search engine 114 is not available a direct answer weight can be set low. If search responses have an inferred quality that is high or otherwise indicative of being reputable, an inferred quality weight can be set high. If search responses have an inferred quality that is low or otherwise indicative of being reputable, an inferred quality weight can be set low. If a serving cost per like request is high, a serving cost weight can be set high. If serving cost per like request is low, the serving cost per request can be set low. If an available compute budget from the search provider for the search engine 114 is high, a search engine compute budget weight can be set high. If an available compute budget from the search provider for the search engine 114 is low, a search engine compute budget weight can be set low or middle. If an available compute budget from the search provider for the chat engine 120 is high, a chat engine compute budget weight can be set low. If an available compute budget from the search provider for the chat engine 120 is low, a search engine compute budget weight can be set high or middle. If a hallucination rate of the chat engine 120 is high, a hallucination rate weight can be set high. If a hallucination rate of the chat engine 120 is low, a hallucination rate weight can be set low.

The criterion processor 222 can sum the weights, average the weights, or the like to generate a response. The criterion processor 222 can make a routing decision based on the response.

The preceding heuristic description is deterministic. A variational version of the criterion processor 222 can include using a machine learning (ML) model to determine a routing decision based on the criterion (whether the provider criterion 230, the user criterion 238, or a combination thereof). The weights of the criterion can be converted to a feature vector that is used as input to the ML model. The ML model can then make the routing decision based on the feature vector. The ML model can be trained in a supervised manner based on historical feature vectors and corresponding routing decisions. The ML model can include a reinforcement learning model that operates using a cost function that optimizes a search parameter or parameters. The ML model can be trained to optimize for a cost, such as user satisfaction, accuracy of responses, compute bandwidth consumed, power consumed, a combination thereof, or the like.

The routing decision 232 can control an output of a multiplexer 224 or a similar structure that routes to different destinations. The content 240 of the search request 124 can be provided to the search engine 114 on channel 234 if the routing decision 232 indicates the search engine 114. The content 240 of the search request 124 can be provided to the chat engine 120 on channel 236 if the routing decision 232 indicates the chat engine 120.

The port (whether the input port 242, the first output port 244, or the second output port 246) can include a hardware port such as an ethernet port, universal serial bus (USB) port, a communication port such as a transmission control protocol (TCP), user datagram protocol (UDP), internet protocol (IP) port, transport layer security (TLS), secure socket layer (SSL), or the like.

The router 112 can monitor requests and (a) recommend a change in modality to the user 116 (e.g., from search to chat), (b) change the modality directly, or (c) do nothing if the current modality is optimal or user has disabled the functionality. To make the user experience less disjointed, the interface to the router 112 for the search engine 114 and the chat engine 120 can be implemented within a single interface. For example, the user 112 can be presented, by the web browser 102, with an interface to the chat engine 120, with the output from the search engine 114 provided through the interface to the chat engine 120. This can include showing top 2-3 search results (e.g., hyperlinks) inline in chat for a request best served with the search engine 114.

The router 112, when there is no criterion that is determinative, can try to optimize at least two parameters per request. For example, the router 112 can optimize over answer quality and serving cost criterion. Any existing ML optimization strategy can be used to make this determination. In its simplest form, the ML optimization can be implemented as a binary classifier (classes=search and chat) built using deep NNs (DNNs) or other ML classification methods. Training and test data on answer quality can be provided by human judges initially and stored in the search history database 126. The data can be scaled to utilize telemetry data/feedback over time as data become available. Data from the web search provider 110 on serving cost per request can be recorded in the search history database 126 as well. An LLM such as GPT-4 may also be able to make this determination and could be fine-tuned (and likely compressed/distilled to reduce its size and computational footprint) for making a routing decision. The model implemented by the criterion processor 222 can include GPT-4 or other model that can make such decisions.

The routing decision can be based on a current search request 124 or based on, more broadly, on a search session history or chat conversation history (all interactions in the session or conversation up to and including the current request). The routing, by the router 112, can be a default option for each request or can be recommended during the search session or conversation if the system infers that the user is, for example, struggling or exploring. To do this, the system 100 can infer a current state of the search based on their observable actions. A demonstrated lack of convergence can aid the decision in determining whether to trigger the router 112.

Rather than making a binary determination to direct users to one of two separate user experiences, a hybrid solution is also possible. This routing mechanism could help to decide whether to show an LLM-powered chat answer on a traditional search engine result page and/or whether to promote the usage of the chat answer by, for example, proactive outreach to the user ("can I help you with that?"). Decisions about if and how to promote chat can be based on model confidence.

The current context and history can be shared with the router 112, such as by the search history database 126 and to enrich its task model. There can be a feedback loop where the system 100 refines its estimates of which modalities are best based on implicit or explicit feedback (e.g., about task success). Telemetry data reflecting the interactions post selection can also be captured and used to estimate task success or task efficiency.

Figure 3:
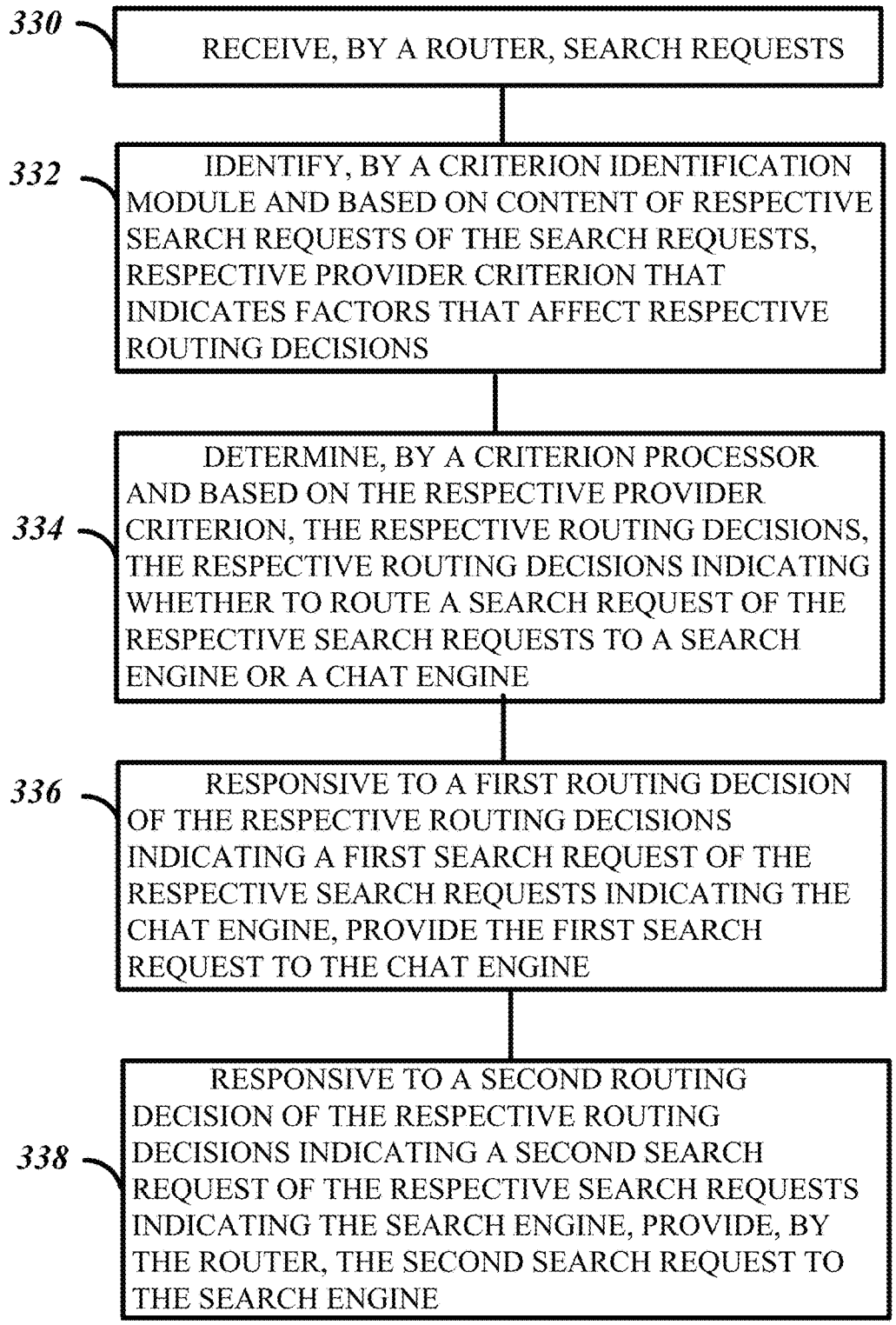
FIG. 3 illustrates, by way of example, a diagram of an embodiment of a method for web search routing.

FIG. 3 illustrates, by way of example, a diagram of an embodiment of a method 300 for web search routing. The method 300 as illustrated includes receiving, by a router, search requests, at operation 330; identifying, by a criterion identification module and based on content of respective search requests of the search requests, respective provider criterion that indicates factors that affect respective routing decisions, at operation 332; determining, by a criterion processor and based on the respective provider criterion, the respective routing decisions, the respective routing decisions indicating whether to route a search request of the respective search requests to a search engine or a chat engine, at operation 334; responsive to a first routing decision of the respective routing decisions indicating a first search request of the respective search requests indicating the chat engine, providing the first search request to the chat engine, at operation 336; and responsive to a second routing decision of the respective routing decisions indicating a second search request of the respective search requests indicating the search engine, providing, by the router, the second search request to the search engine, at operation 338.

The method 300 can further include, wherein search requests of the respective search requests include user-specified criterion, the user-specified criterion includes a factor to be considered by the router in making the routing decision. The method 300 can further include weighting, by the router, the provider criterion resulting in weighted criterion, weights of the provider criterion balance a higher cost in operating the chat engine with an accuracy of responses provided responsive to the search request. The method 300 can further include, wherein the respective routing decisions are determined using a machine learning (ML) model and based on the weighted criterion.

The method 300 can further include routing, a given search request of the respective search requests, to the search engine responsive to determining a direct answer to the search request is available regardless of another criterion. The method 300 can further include routing, a given search request of the respective search requests, to the chat engine responsive to determining an answer to the given search request requires generating content regardless of another criterion.

Artificial Intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as classification, device behavior modeling (as in the present application) or the like. The trained model 226, criterion processor 222, chat engine 120, or other component or operation can include or be implemented using one or more NNs.

Many NNs are represented as matrices of weights (sometimes called parameters) that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph-if the threshold is not exceeded then, generally, the value is not transmitted to a down-graph neuron and the synaptic connection remains inactive. The process of weighting and testing continues until an output neuron is reached; the pattern and values of the output neurons constituting the result of the NN processing.

The optimal operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights.

In some examples, initial weights may be randomly selected. Training data is fed into the NN, and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 4:
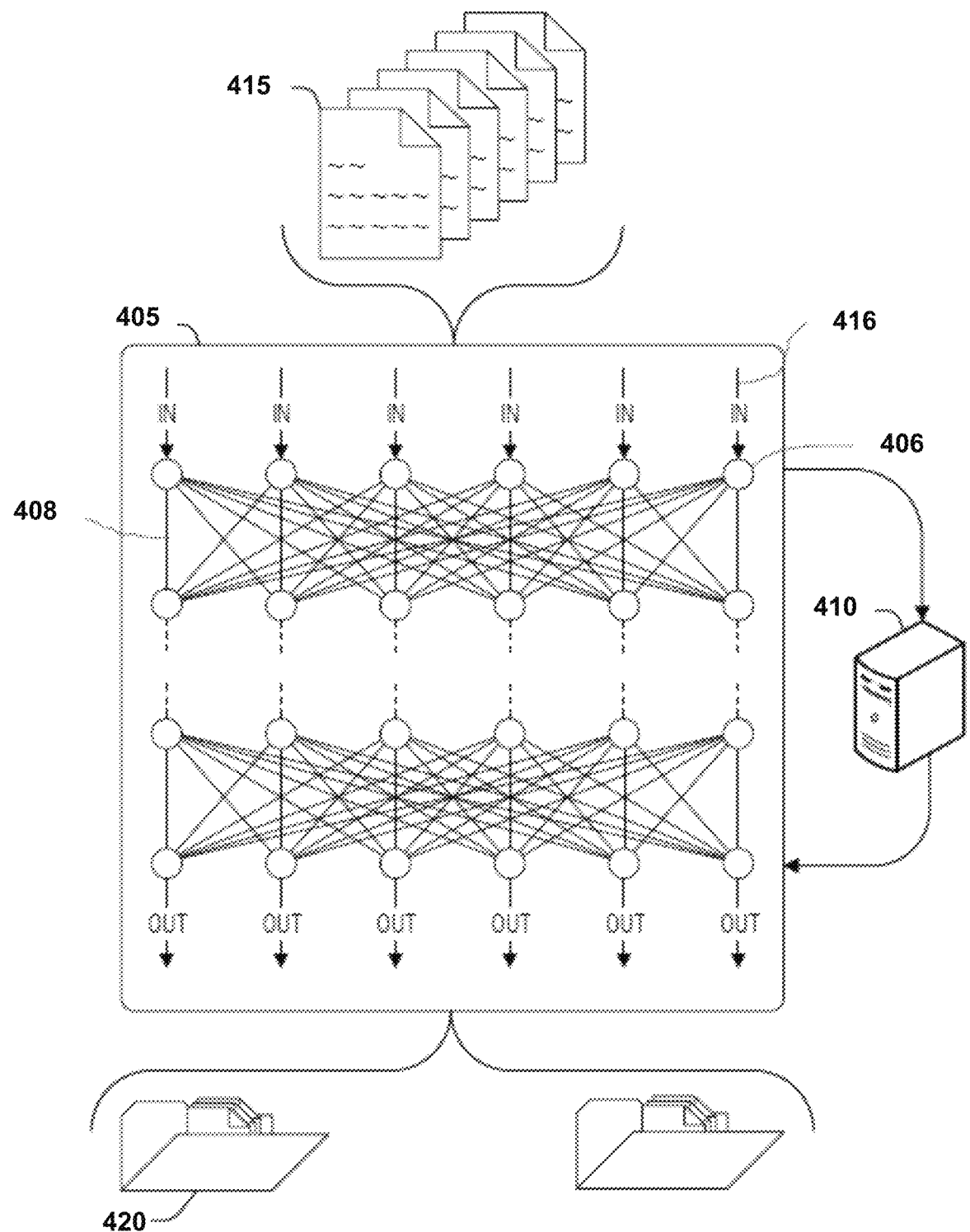
FIG. 4 is a block diagram of an example of an environment including a system for neural network (NN) training.

FIG. 4 is a block diagram of an example of an environment including a system for neural network (NN) training. The system includes an artificial NN (ANN) 405 that is trained using a processing node 410. The processing node 410 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 405, or even different nodes 407 within layers. Thus, a set of processing nodes 410 is arranged to perform the training of the ANN 405. The trained model 226, criterion processor 222, or the like, can be trained using the system.

The set of processing nodes 410 is arranged to receive a training set 415 for the ANN 405. The ANN 405 comprises a set of nodes 407 arranged in layers (illustrated as rows of nodes 407) and a set of inter-node weights 408 (e.g., parameters) between nodes in the set of nodes. In an example, the training set 415 is a subset of a complete training set. Here, the subset may enable processing nodes with limited storage resources to participate in training the ANN 405.

The training data may include multiple numerical values representative of a domain, such as an image feature, or the like. Each value of the training or input 417 to be classified after ANN 405 is trained, is provided to a corresponding node 407 in the first layer or input layer of ANN 405. The values propagate through the layers and are changed by the objective function.

As noted, the set of processing nodes is arranged to train the neural network to create a trained neural network. After the ANN is trained, data input into the ANN will produce valid classifications 420 (e.g., the input data 417 will be assigned into categories), for example. The training performed by the set of processing nodes 407 is iterative. In an example, each iteration of the training the ANN 405 is performed independently between layers of the ANN 405. Thus, two distinct layers may be processed in parallel by different members of the set of processing nodes. In an example, different layers of the ANN 405 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 407 (e.g., neurons) are trained independently. In an example, the nodes are trained on different hardware.

Figure 5:
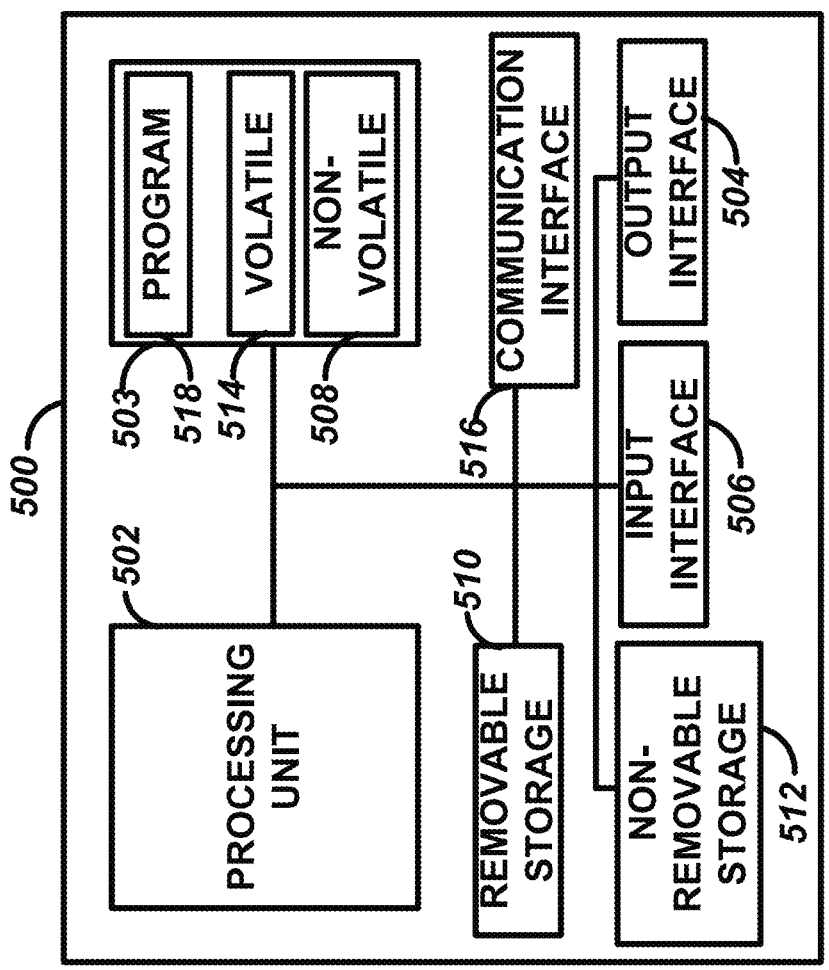
FIG. 5 is a block schematic diagram of a computer system to perform search request routing, and for performing methods and algorithms according to example embodiments.

FIG. 5 is a block schematic diagram of a computer system 500 to perform search request routing, and for performing methods and algorithms according to example embodiments. Any of the components of the compute system 118, router 112, network 108, web search provider 110, router 112, search engine 114, chat engine 120, criterion identification module 220, trained model 226, heuristic model 228, criterion processor 222, multiplexer 224, operations of the method 300, or other component or operation can be implemented using the system 500 or a component thereof. All components of the system 500 need not be used in various embodiments.

One example computing device in the form of a computer 500 may include a processing unit 502, memory 503, removable storage 510, and non-removable storage 512. Although the example computing device is illustrated and described as computer 500, the computing device may be in different forms in different embodiments. For example, the computing device may instead be a smartphone, a tablet, smartwatch, smart storage device (SSD), or other computing device including the same or similar elements as illustrated and described with regard to FIG. 5. Devices, such as smartphones, tablets, and smartwatches, are generally collectively referred to as mobile devices or user equipment.

Although the various data storage elements are illustrated as part of the computer 500, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 503 may include volatile memory 514 and non-volatile memory 508. Computer 500 may include—or have access to a computing environment that includes—a variety of computer-readable media, such as volatile memory 514 and non-volatile memory 508, removable storage 510 and non-removable storage 512. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 500 may include or have access to a computing environment that includes input interface 506, output interface 504, and a communication interface 516. Output interface 504 may include a display device, such as a touchscreen, that also may serve as an input device. The input interface 506 may include one or more of a touchscreen, touchpad, mouse, keyboard, camera, one or more device-specific buttons, one or more sensors integrated within or coupled via wired or wireless data connections to the computer 500, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 500 are connected with a system bus 520.

Computer-readable instructions stored on a computer-readable medium are executable by the processing unit 502 of the computer 500, such as a program 518. The program 518 in some embodiments comprises software to implement one or more methods described herein. A hard drive, CD-ROM, and RAM are some examples of articles including a non-transitory computer-readable medium such as a storage device. The terms computer-readable medium, machine readable medium, and storage device do not include carrier waves or signals to the extent carrier waves and signals are deemed too transitory. Storage can also include networked storage, such as a storage area network (SAN). Computer program 518 along with the workspace manager 522 may be used to cause processing unit 502 to perform one or more methods or algorithms described herein.

EXAMPLES AND ADDITIONAL NOTES

Example 1 includes a web search router comprising an input port that receives a search request, a criterion identification module that identifies, based on content of the search request, provider criterion that indicates factors to be considered in making a routing decision, a criterion processor that determines, based on the provider criterion, a routing decision indicating whether to route the search request to a search engine or a chat engine based, at least in part, respective compute costs of servicing the search request using the search engine and the chat engine, respectively, and respective accuracies of responses provided responsive to the search request using the search engine and the chat engine, respectively, the search engine configured to provide, based on the search request, existing content and the chat engine configured to generate, based on the search request, new content, and an output port coupled to receive the search request and coupled to provide the search request to the search engine or the chat engine in accord with the routing decision.

In Example 2, Example 1 further includes, wherein the search request further includes user criterion that includes a factor to be considered by a web search provider in making the routing decision.

In Example 3, Example 2 further includes, wherein the factor indicates a preference for using the chat engine or the search engine in answering the search request.

In Example 4, at least one of Examples 2-3 further includes, wherein the user criterion includes data indicating a preference for accuracy of the responses of the search request.

In Example 5, at least one of Examples 1-4 further includes, wherein the criterion processor weights the provider criterion resulting in weighted criterion, and weights of the provider criterion are applied to balance a higher cost in operating the chat engine with an accuracy of responses provided responsive to the search request.

In Example 6, Example 5 further includes, wherein the criterion processor operates a machine learning (ML) model based on the weighted criterion.

In Example 7, at least one of Examples 1-6 further includes, wherein the criterion processor is configured to, responsive to determining a direct answer to the search request is available, route the search request to the search engine regardless of any other criterion.

In Example 8, at least one of Examples 1-7 further includes, wherein the criterion processor is configured to, responsive to determining an answer to the search request requires generating content, route the search request to the chat engine regardless of any other criterion.

In Example 9, at least one of Examples 1-8 further includes a search history database communicatively coupled to the criterion processor, the search history database including entries that detail search requests that have a direct answer and search requests that are accurately answered by the chat engine.

Example 10 includes a web search routing method comprising receiving, by a router, search requests, identifying, by a criterion identification module and based on content of respective search requests of the search requests, respective provider criterion that indicates factors that affect respective routing decisions, determining, by a criterion processor and based on the respective provider criterion, the respective routing decisions, the respective routing decisions indicating whether to route a search request of the respective search requests to a search engine or a chat engine, responsive to a first routing decision of the respective routing decisions indicating a first search request of the respective search requests indicating the chat engine, providing the first search request to the chat engine, and responsive to a second routing decision of the respective routing decisions indicating a second search request of the respective search requests indicating the search engine, providing, by the router, the second search request to the search engine.

In Example 11, Example 10 further includes, wherein search requests of the respective search requests include user-specified criterion, the user-specified criterion includes a factor to be considered by the router in making the routing decision.

In Example 12, at least one of Examples 10-11 further includes weighting, by the router, the provider criterion resulting in weighted criterion, weights of the provider criterion balance a higher cost in operating the chat engine with an accuracy of responses provided responsive to the search request.

In Example 13, Example 12 further includes, wherein the respective routing decisions are determined using a machine learning (ML) model and based on the weighted criterion.

In Example 14, at least one of Examples 10-13 further includes routing, a given search request of the respective search requests, to the search engine responsive to determining a direct answer to the search request is available regardless of another criterion.

In Example 15, at least one of Examples 10-14 further includes routing, a given search request of the respective search requests, to the chat engine responsive to determining an answer to the given search request requires generating content regardless of another criterion.

Example 16 includes a system for web search routing, the system comprising a search history database including entries that detail search requests that have a direct answer and search requests that require generating content, and a web search router communicatively coupled to the search history database, the web search router comprising a criterion identification module that identifies, based on content of a user-issued search request, provider criterion that indicates factors to be considered in making a routing decision, and a criterion processor that determines, based on the provider criterion, a routing decision for the search request, the routing decision indicating whether to provide the search request to a search engine or a chat engine, the search engine configured to provide, based on the search request, existing content and the chat engine configured to generate, based on the search request, new content, the criterion processor determines to route the user-issued search request to the search engine when the user-issued search request has a direct answer.

In Example 17, Example 16 further includes, wherein the router makes the routing decision based, at least in part, on compute cost of servicing the search request using the chat engine and an accuracy of responses provided responsive to the search request.

In Example 18, at least one of Examples 16-17 further includes, wherein the search request further includes user criterion that indicates a factor to be considered by the criterion processor in making the routing decision.

In Example 19, Example 18 further includes, wherein the user criterion includes data indicating a preference for using the chat engine or the search engine in answering the search request.

In Example 20, at least one of Examples 18-19 further includes, wherein the user criterion includes data indicating a preference for accuracy of responses of the search request.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine. Thus, a module can include software, hardware that executes the software or is configured to implement a function without software, firmware, or a combination thereof.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, e.g., hard disk, floppy disk, magnetic strips, optical disk, compact disk (CD), digital versatile disk (DVD), smart cards, flash memory devices, among others. In contrast, computer-readable media, i.e., not storage media, may additionally include communication media such as transmission media for wireless signals and the like.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A web search router comprising:
   an input port that receives a search request from a computer network, the search request including user-specified criterion that includes a factor that indicates a preference for using a chat engine or a search engine in answering the search request;
   a criterion identification module that identifies, based on content of the search request, provider criterion that indicates factors to be considered in making a routing decision, the provider criterion including respective compute costs of servicing the search request using the search engine and the chat engine, respectively;
   a criterion processor that determines, based on the provider criterion, a routing decision indicating whether to route the search request to a search engine or a chat engine coupled to the computer network based, at least in part, on (i) respective accuracies of responses provided responsive to the search request using the search engine and the chat engine, respectively, (ii) the provider criterion, and (iii) the user-specified criterion, the search engine configured to provide, based on the search request, existing content and the chat engine configured to generate, based on the search request, new content, the criterion processor weights the (i) respective accuracies of responses provided responsive to the search request using the search engine and the chat engine, respectively, (ii) the provider criterion, and (iii) the user-specified criterion resulting in weighted criterion, and the weights balance a higher cost in operating the chat engine with an accuracy of responses provided responsive to the search request; and
   an output port coupled to receive the search request and coupled to provide the search request to the search engine or the chat engine over the computer network and in accord with the routing decision.

2. The web search router of claim 1, wherein the user-specified criterion includes data indicating a preference for accuracy of the responses of the search request.

3. The web search router of claim 1, wherein the criterion processor operates a machine learning (ML) model based on the weighted criterion.

4. The web search router of claim 1, wherein the criterion processor is configured to, responsive to determining a direct answer to the search request is available, route the search request to the search engine regardless of any other criterion.

5. The web search router of claim 1, wherein the criterion processor is configured to, responsive to determining an answer to the search request requires generating content, route the search request to the chat engine regardless of any other criterion.

6. The web search router of claim 1, further comprising a search history database communicatively coupled to the criterion processor, the search history database including entries that detail search requests that have a direct answer and search requests that are accurately answered by the chat engine.

7. A web search routing method comprising:
   receiving, by a router and from a computer network, search requests the search request including user-specified criterion that includes a factor that indicates a preference for using a chat engine or a search engine in answering the search request;
   identifying, by a criterion identification module and based on content of respective search requests of the search requests, respective provider criterion that indicates factors that affect respective routing decisions, the provider criterion including respective compute costs of servicing the search request using the search engine and the chat engine, respectively;

determining, by a criterion processor and based, at least in part, on (i) the respective provider criterion, (ii) respective accuracies of responses provided responsive to the search request using the search engine and the chat engine, respectively, and (iii) the user-specified criterion, the respective routing decisions, the respective routing decisions indicating whether to route a search request of the respective search requests to the search engine or the chat engine coupled to the computer network, determining the respective routing decisions includes weighting the (i) the respective provider criterion, (ii) respective accuracies of responses provided responsive to the search request using the search engine and the chat engine, respectively, and (iii) the user-specified criterion resulting in weighted criterion, and the weights balance a higher cost in operating the chat engine with an accuracy of responses provided responsive to the search request;

responsive to a first routing decision of the respective routing decisions indicating a first search request of the respective search requests indicating the chat engine, providing the first search request to the chat engine; and responsive to a second routing decision of the respective routing decisions indicating a second search request of the respective search requests indicating the search engine, providing, by the router, the second search request to the search engine.

8. The method of claim 7, wherein the respective routing decisions are determined using a machine learning (ML) model and based on the weighted criterion.

9. The method of claim 7, further comprising routing, a given search request of the respective search requests, to the search engine responsive to determining a direct answer to the search request is available regardless of another criterion.

10. The method of claim 7, further comprising routing, a given search request of the respective search requests, to the chat engine responsive to determining an answer to the given search request requires generating content regardless of another criterion.

11. A system for web search routing, the system comprising:

a search history database including entries that detail search requests that have a direct answer and search requests that require generating content, the search requests including respective user-specified criterion that include a factor that indicates a preference for using a chat engine or a search engine in answering a respective search request of the search requests; and a web search router communicatively coupled to the search history database, the web search router comprising:

a criterion identification module that identifies, based on content of a user-issued search request, provider criterion that indicates factors to be considered in making a routing decision, the provider criterion including respective compute costs of servicing the search request using the search engine and the chat engine, respectively; and a criterion processor that determines, based, at least in part, on (i) the provider criterion, (ii) respective accuracies of responses provided responsive to the search request using the search engine and the chat engine, respectively, and (iii) the user-specified criterion, respective routing decisions for the search requests, the routing decisions indicating whether to provide the search request to a search engine or a chat engine, the search engine configured to provide, based on the search request, existing content and the chat engine configured to generate, based on the search request, new content, the criterion processor determines to route a user-issued search request of the search requests to the search engine when the user-issued search request has a direct answer according to the search history database and the criterion processor determines where to route a second user-issued search request of the search requests by weighting (i) the provider criterion, (ii) the respective accuracies of responses provided responsive to the search request using the search engine and the chat engine, respectively, and (iii) the user-specified criterion resulting in weighted criterion, and the weights balance a higher cost in operating the chat engine with an accuracy of responses provided responsive to the search request.

12. The system of claim 11, wherein the user-specified criterion includes data indicating a preference for accuracy of responses of the search request.

* * * * *